Patented Oct. 31, 1950

2,527,577

UNITED STATES PATENT OFFICE 2,527,577

SALTS OF CONDENSATES OF ROSIN WITH UNSATURATED ACYCLIC HYDROCARBONS

Alfred L. Rummelsburg, Wilmington, Del., assignor to Hercules Powder Company, Wilmington, Del., a corporation of Delaware No Drawing. Application July 11, 1947,
Serial No. 760,491

10 Claims. (Cl. 106—227)

This invention relates to the salts of resinous condensation products of rosin with unsaturated acyclic hydrocarbons and to varnish compositions containing them.

Rosin has long been known to be deficient, alone or in the form of its esters, for use in varnishes, particularly because of its softness and poor bodying characteristics. Various modifications, such as polymerization, etc., have been suggested in an attempt to overcome these deficiencies. While some improvement has been obtained by the polymerization of rosin, an entirely satisfactory product has not been produced. Metal resinates of polymerized rosin have also been prepared, but in order to obtain the desired increase in melting point, etc., it has been necessary to incorporate a large percentage of the metal in the compound, which has resulted in a serious reduction in the solubility of these resinates in organic solvents and, accordingly, they are not capable of incorporation in a varnish in the desired amounts.

Now, in accordance with this invention, it has been found that metal salts of a condensate of rosin with an unsaturated acyclic hydrocarbon may be formed, which salts are particularly valuable for use in protective coatings such as varnish, having excellent bodying and drying characteristics and forming harder films of improved water-resistance. The metal salts of the rosin condensates in accordance with this invention are high-melting resinous materials which contain substantially smaller contents of combined metals than were previously possible for a resinate of comparable melting point. As a result, they may be incorporated in a varnish or paint in the same proportions as the usual nonmetallic resins. These new products not only contribute increased viscosities to varnishes but the varnishes containing them becomes less reduced in viscosity on storage.

The following examples are illustrative of the preparation of the new metal salts of the rosin-unsaturated acyclic hydrocarbon condensates in accordance with this invention. All parts and percentages are by weight unless otherwise indicated.

EXAMPLE 1

A rosin-butadiene condensate was prepared by the following procedure. To a solution of 575 parts of wood rosin dissolved in 3255 parts of ethylene dichloride cooled to −12° C. was added 320 parts of liquid butadiene. Boron trifluoride gas was then passed into this solution during a period of about 30 minutes until 12 parts of boron trifluoride was absorbed, the temperature being held at −12° to −5° C. during the addition. The reaction mixture was then allowed to stand for four hours at room temperature with occasional stirring and cooling, during which time the temperature was held at 40° to 42° C. The solution was then washed with water at 50°–60° C. to remove the catalyst and then 200 parts of xylene was added to reduce the viscosity during the distillation to remove the solvent. The solvents were then removed by distillation. The condensate which remained as a residue amounted to 782 parts. It contained about two moles of combined butadiene per mole of rosin (26.4% combined butadiene) and had the following analysis: acid number, 100.5; drop melting point, 143° C.; capillary melting point—softens, 93°–99° C.; melts, 104°–114° C.

Drier metal salts of this rosin-butadiene condensate were prepared by heating the condensate to 235° C. and then gradually adding, with intermittent stirring, during a period of about 40 minutes, the metal salt, while simultaneously increasing the temperature to about 320° C. The hot, highly viscous resin was then cooled to room temperature and analyzed. The data on the preparation and characteristics of the metal salts of the rosin-butadiene condensate are given in Table I.

EXAMPLE 2

A rosin-butadiene condensate was prepared by the method described for preparing the condensate in Example 1 except that toluene (2820 parts) was used as the solvent for the reaction and the amount of wood rosin used was 600 parts. The rosin-butadiene condensate obtained amounted to 778 parts and contained about 1.65 moles of butadiene per mole of rosin (23.1% combined butadiene) and had the following analysis: acid number, 121; drop melting point, 89.5° C.; capillary melting point—softens, 52°–57° C.; melts, 67°–72° C.

Drier metal salts of this rosin-butadiene condensate were prepared by the fusion method described in the foregoing example. The rata on the preparation and characteristics of the metal salts of this rosin-butadiene condensate are given in Table II. In the preparation of these salts, the maximum temperature for the metal acetate addition was 320° C. for the first group in the table and 255° C. for the second group.

TABLE I

*Metal salts of rosin-butadiene condensate*

| Parts of Condensate | Salt | Parts of Salt | Yield of Product | Per Cent Metal in Product | Capillary Melting Point of Product | |
|---|---|---|---|---|---|---|
| | | | | | Softens | Melts |
| | | | | | ° C. | ° C. |
| 15.00 | Pb(OAc)₂.3H₂O | 4.89 | 17.46 | 15.1 | 127-133 | 145-162 |
| 15.00 | Zn(OAc)₂.2H₂O | 1.89 | 15.21 | 3.6 | 119-125 | 134-141 |
| 15.00 | Ca(OAc)₂.H₂O | 1.67 | 15.23 | 2.5 | 133-138 | 156-175 |
| 15.00 | Mn(OAc)₂.4H₂O | 1.94 | 15.18 | 2.8 | 131-136 | 149-156 |
| 15.00 | Co(OAc)₂.4H₂O | 2.29 | 15.49 | 3.5 | 134-142 | 139-178 |
| 15.00 | Al₂O(OAc)₄.4H₂O | 1.21 | 15.96 | 1.1 | 134-140 | 158-165 |

TABLE II

*Metal salts of rosin-butadiene condensate*

| Parts of Condensate | Salt | Parts of Salt | Yield of Product | Per Cent Metal in Product | Capillary Melting Point of Product | |
|---|---|---|---|---|---|---|
| | | | | | Softens | Melts |
| | | | | | ° C. | ° C. |
| 15.00 | Mn(OAc)₂.4H₂O | 3.97 | 15.1 | 5.8 | 112-118 | 127-136 |
| 15.00 | Co(OAc)₂.4H₂O | 4.04 | 15.0 | 6.4 | 122-129 | 143-185 |
| 15.00 | Ca(OAc)₂.H₂O | 2.85 | 16.4 | 4.0 | 107-113 | 125-135 |
| 15.00 | Al₂O(OAc)₄.4H₂O | 2.04 | 13.2 | 2.2 | 112-117 | 126-131 |
| 15.00 | Zn(OAc)₂.2H₂O | 3.56 | 15.4 | 6.9 | 81-88 | 102-111 |
| 15.00 | Pb(OAc)₂.3H₂O | 6.15 | 17.7 | 18.9 | 95-101 | 109-117 |
| 15.00 | Mn(OAc)₂.4H₂O | 1.98 | 14.1 | 3.1 | 85-89 | 96-102 |
| 15.00 | Co(OAc)₂.4H₂O | 2.02 | 14.4 | 3.1 | 88-95 | 115-135 |
| 15.00 | Ca(OAc)₂.H₂O | 1.43 | 15.3 | 2.2 | 80-85 | 93-101 |
| 15.00 | Al₂O(OAc)₄.4H₂O | 1.02 | 13.7 | 1.1 | 78-84 | 97-102 |
| 15.00 | Zn(OAc)₂.2H₂O | 1.78 | 14.3 | 3.7 | 75-80 | 85-91 |
| 15.00 | Pb(OAc)₂.3H₂O | 3.08 | 15.4 | 10.1 | 80-85 | 92-98 |

EXAMPLE 3

A rosin-isoprene condensate was prepared by passing boron trifluoride into an agitated solution of 100 parts of gum rosin and 80 parts of isoprene in 850 parts of ethylene dichloride for one hour until about 11 parts of the catalyst had been absorbed, the temperature of the solution being held at 0°-8° C. Agitation was continued for about one-half hour and the solution warmed to room temperature. The reaction mixture was then allowed to stand at 0°-5° C. for about 17 hours, after which it was washed with warm water (50°-60° C.). The solvent was then removed by distillation, using a final bath temperature of 200° C. and a pressure of about 28 mm. The rosin-isoprene condensate obtained had the following analysis: acid number, 82; drop melting point, 149° C.; capillary melting point—softens, 99°-105° C.; melts, 110°-120° C.

Drier metal salts of this rosin-isoprene condensate were prepared by the fusion method described in Example 1, the maximum temperature used being 320° C. The data on the preparation and characteristics of the metal salts of this rosin-isoprene condensate are given in Table III.

EXAMPLE 4

A rosin-isobutene condensate was prepared by the following procedure. A solution of 150 parts of wood rosin in 850 parts of ethylene dichloride was cooled to −10° to −15° C. and 42 parts of isobutene was added. With the temperature held at that point, boron trifluoride gas was passed into the solution during a period of 15 minutes, about three parts of the catalyst being absorbed by the solution. The reaction mixture was then warmed to about 45° C. for four hours, after which it was washed with warm water. The viscosity of the solution was reduced by adding 100 parts of xylene, and the solvents were then removed by distillation. The condensate which remained as a residue amounted to 169 parts and had the following analysis: acid number, 144.5; drop melting point, 88° C.; capillary melting point—softens, 60°-64° C.; melts, 73°-78° C.

Drier metal salts of this rosin-isobutene condensate were prepared by the fusion method described in Example 1, the maximum temperature used being 275° C. The data on the preparation and characteristics of the metal salts of this rosin-isobutene condensate are given in Table IV.

TABLE III

*Metal salts of rosin-isoprene condensate*

| Parts of Condensate | Salt | Parts of Salt | Yield of Product | Per Cent Metal in Product | Capillary Melting Point of Product | |
|---|---|---|---|---|---|---|
| | | | | | Softens | Melts |
| | | | | | ° C. | ° C. |
| 15.00 | Zn(OAc)₂.2H₂O | 1.55 | 15.1 | 3.1 | 121-126 | 140-146 |
| 15.00 | Ca(OAc)₂.H₂O | 1.37 | 15.2 | 2.1 | 139-144 | 162-178 |

TABLE IV

*Metal salts of rosin-isobutene condensate*

| Parts of Condensate | Salt | Parts of Salt | Yield of Product | Per Cent Metal in Product | Capillary Melting Point of Product | |
|---|---|---|---|---|---|---|
| | | | | | Softens | Melts |
| | | | | | ° C. | ° C. |
| 15.00 | Zn(OAc)₂.2H₂O | 2.17 | 15.6 | 4.15 | 88–93 | 105–112 |
| 15.00 | Ca(OAc)₂.H₂O | 1.75 | 15.3 | 2.60 | 99–107 | 119–131 |

The rosin condensates from which the metal salts are prepared in accordance with this invention may be prepared by the condensation of rosin with an unsaturated acyclic hydrocarbon capable of self-polymerization to a hemicolloid. The rosins which are used are those having ethylenic unsaturation, such as the natural rosins of the type of wood and gum rosin, and treated rosins, such as heat-bleached, heat-treated, and isomerized rosins.

The unsaturated acyclic hydrocarbons used are those which are capable of self-polymerization to hemicolloids; i. e., to polymers having at least 20 to 100 units per polymer molecule. Acyclic compounds of this type and suitable for use in this invention are compounds having a single center of unsaturation, such as ethylene, propylene, and isobutene, and compounds having at least two centers of unsaturation, such as butadiene, 2-chlorobutadiene, isoprene, 2,3-dimethyl butadiene, vinyl acetylene, piperylene, 2-methyl pentadiene-1,3, and divinyl acetylene. The unsaturated acyclic hydrocarbon will preferably be one containing from two to six carbon atoms in the straight chain. Mixtures of any of these compounds may be used. The molecular ratio of rosin to unsaturated acyclic hydrocarbon in the condensation may vary from about 0.1 to 20. Any unreacted unsaturated acyclic compound remaining may be removed from the condensation product, as, for example, by distillation.

The condensation is usually carried out in the presence of a catalyst, such as the Friedel-Crafts-type catalysts or a mineral acid condensation catalyst, at a temperature of $-50°$ C. to $150°$ C., depending upon the catalyst used. The condensation may be carried out in the absence of a catalyst, in which case a higher reaction temperature is desirable, such as $125°$–$350°$ C. An inert solvent may be used in the preparation of the condensate, if desired, in order to improve the fluidity of the reactants and to facilitate the dispersion of the catalyst.

The condensation products of rosin with unsaturated acyclic hydrocarbons having a single center of unsaturation appear to be high molecular weight monocarboxylic acids containing chiefly only one resin acid nucleus per molecule. These acids may be mixtures of condensation products wherein one or more molecules of unsaturated acyclic hydrocarbon, for example, are condensed with a single resin acid molecule. The condensation products of rosin with unsaturated acyclic hydrocarbons having more than one center of unsaturation in the molecule appear to contain polybasic acids wherein more than one resin acid nucleus has been condensed with the polyunsaturated acyclic compound. Moreover, the condensate appears to be a mixture of monocarboxylic acids and polycarboxylic acids, depending upon the conditions used in effecting the condensation. An example of such a condensate is that of rosin and butadiene. The condensation products containing various ratios of rosin acid to acyclic hydrocarbon are prepared by varying the amount of unsaturated acyclic hydrocarbon added in the condensation and by controlling the rate of condensation.

Any metal salt of the rosin-condensates of this invention may be prepared, as, for example, the alkali metal salts, alkaline earth salts, and the usual metallic salts. Of particular importance are the water-insoluble or drier metal salts since these are the salts of most value for use in varnishes and other protective coatings. Among the drier metal salts which may be mentioned are the calcium, zinc, cobalt, manganese, lead, copper, aluminum, etc., salts.

The metal salts of the rosin-acyclic hydrocarbon condensates and, particularly, the water-insoluble metal salts are most conveniently prepared by heating the rosin condensates with the oxide or fatty acid salt, such as the acetate, butyrate, etc., of the metal to a temperature of from about $200°$ C. to about $360°$ C. and, preferably, to a temperature of about $250°$ C. to about $340°$ C. until the reaction is complete. The water-insoluble metal salts may also be prepared by forming an aqueous solution of an alkali metal salt of the rosin condensate and then adding a water-soluble salt of the drier metal.

The salts of the different metals will contain an amount of the metal which will vary with the equivalent combining proportion of the particular metal. The salts may be the neutral salts or they may be acid salts in which an insufficient amount of the metal is present to completely neutralize the rosin condensate. For use in the preparation of varnishes, the metal salts of the rosin condensates will contain at least 1% of combined metal. When high-melting rosin condensates; i. e., those having a melting point of $120°$–$140°$ C. or above, are used to prepare the salt, usually an amount of metal less than the equivalent based on its valence is added, whereas, in the case of the rosin condensates having melting points of less than $100°$ C., it may sometimes be desirable to add as much as one equivalent of the metal.

Varnishes may be produced from the metal salts of the rosin condensates of this invention by the customary varnish-making techniques. Drying oils which may be used in combination with these metal salts are linseed oil, tung oil, dehydrated castor oil, soya oil, fish oil, sunflower seed oil, rapeseed oil, perilla oil, oiticica oil, hempseed oil, etc. Driers, such as lead and cobalt naphthenates, are usually added. Any of the usual solvents, such as the volatile petroleum hydrocarbons, may be used as thinners for the varnishes, the amount of solvent added being that amount which will yield a free-flowing mixture capable of application in a thin film. The following example illustrates the preparation of varnishes with the metal salts in accordance with this invention.

EXAMPLE 5

Varnishes having 25-gal. oil length were prepared using the calcium and zinc salts described in the foregoing examples. In each case, the varnish was prepared by heating five parts of the rosin condensate salt with ten parts of linseed oil having a viscosity of Y (Gardner-Holdt) to a temperature of about 585° F. for 20-30 minutes with stirring. The mixture was then held at this temperature until it began to develop viscosity and gave a good pill on glass. After cooling to 430°-450° F., 15 parts of mineral spirits was added as a thinner and about 0.5% lead and 0.07% cobalt were added in the form of the salts of tall oil. Thin films of the varnishes were poured on glass plates and then allowed to air-dry. All of the films were dry within 17 hours. The characteristics of each of the varnishes so prepared are given in the following table:

TABLE V

*Varnishes containing salts of rosin condensates*

| Condensate | Salt | Per Cent Metal in Condensate Salt | Capillary Melting Point of Salt | Time to Reach Pill | Viscosity of Thinned Varnish | Drying Time |
|---|---|---|---|---|---|---|
| | | | °C. | Minutes | | Hours |
| Rosin-Butadiene | Zn | 3.6 | 134-141 | 30 | T | 17 |
| Do | Ca | 2.5 | 156-175 | 15 | T | 17 |
| Do | Zn | 6.9 | 102-111 | 28 | A | 17 |
| Do | Ca | 2.2 | 93-101 | 30 | B | 17 |

The varnishes prepared from the drier metal salts of the rosin condensates, as illustrated above, are superior to varnishes prepared from the prior art resins, having excellent bodying and drying characteristics and forming harder films which have an improved water-resistance. These varnishes also become less reduced in viscosity on storage.

The drier metal salts of the rosin condensates in accordance with this invention are useful as resins and driers in protective coatings, such as varnishes, paints, etc., and in printing inks, etc.

What I claim and desire to protect by Letters Patent is:

1. A metal salt of the condensation product of a rosin with an unsaturated acyclic hydrocarbon capable of self-polymerization to a hemicolloid the molecular ratio of rosin to unsaturated acyclic hydrocarbon in said condensation product being within the range of about 0.1-20.

2. A water-insoluble metal salt of the condensation product of a rosin with an unsaturated acyclic hydrocarbon having a single center of unsaturation and being capable of self-polymerization to a hemicolloid the molecular ratio of rosin to unsaturated acyclic hydrocarbon in said condensation product being within the range of about 0.1-20.

3. A water-insoluble metal salt of the condensation product of a rosin with an unsaturated acyclic hydrocarbon having at least two centers of unsaturation and being capable of self-polymerization to a hemicolloid the molecular ratio of rosin to unsaturated acyclic hydrocarbon in said condensation product being within the range of about 0.1-20.

4. A metal salt of the condensation product of rosin with butadiene the molecular ratio of rosin to butadiene in said condensation product being within the range of about 0.1-20.

5. A water-insoluble metal salt of the condensation product of rosin with butadiene the molecular ratio of rosin to butadiene in said condensation product being within the range of about 0.1-20.

6. The calcium salt of the condensation product of rosin with butadiene the molecular ratio of rosin to butadiene in said condensation product being within the range of about 0.1-20.

7. The zinc salt of the condensation product of rosin with butadiene the molecular ratio of rosin to butadiene in said condensation product being within the range of about 0.1-20.

8. A coating composition comprising a water-insoluble metal salt of the condensation product of a rosin with an unsaturated acyclic hydrocarbon capable of selfpolymerization to a hemicolloid the molecular ratio of rosin to unsaturated acyclic hydrocarbon in said condensation product being within the range of about 0.1-20 and a solvent.

9. A coating composition comprising a water-insoluble metal salt of the condensation product of a rosin with an unsaturated acyclic hydrocarbon capable of selfpolymerization to a hemicolloid, the molecular ratio of rosin to unsaturated acyclic hydrocarbon in said condensation product being within the range of about 0.1-20 a drying oil, and a solvent.

10. A coating composition comprising a water-insoluble metal salt of the condensation product of a rosin with butadiene, the molecular ratio of rosin to butadiene in said condensation product being within the range of about 0.1-20 a drying oil, and a solvent.

ALFRED L. RUMMELSBURG.

REFERENCES CITED

The following references are of record in the file of this patent:

UNITED STATES PATENTS

| Number | Name | Date |
|---|---|---|
| 2,198,046 | Vierling | Apr. 23, 1940 |
| 2,376,382 | Price | May 22, 1945 |
| 2,392,945 | Price | Jan. 15, 1946 |